US009220103B2

(12) United States Patent
Fu

(10) Patent No.: US 9,220,103 B2
(45) Date of Patent: *Dec. 22, 2015

(54) METHOD OF NETWORK ENTRY IN OFDM MULTI-CARRIER WIRELESS COMMUNICATIONS SYSTEMS

(71) Applicant: MEDIATEK, INC., Hsin-Chu (TW)

(72) Inventor: I-Kang Fu, Taipei (TW)

(73) Assignee: MEDIATEK INC. (TW)

( * ) Notice: Subject to any disclaimer, the term of this patent is extended or adjusted under 35 U.S.C. 154(b) by 236 days.

This patent is subject to a terminal disclaimer.

(21) Appl. No.: 13/916,567

(22) Filed: Jun. 12, 2013

(65) Prior Publication Data
US 2013/0294370 A1 Nov. 7, 2013

Related U.S. Application Data

(63) Continuation of application No. 12/387,633, filed on May 4, 2009, now Pat. No. 8,498,249.

(60) Provisional application No. 61/050,277, filed on May 5, 2008, provisional application No. 61/156,574, filed on Mar. 2, 2009, provisional application No. 61/154,022, filed on Feb. 20, 2009.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/0053* (2013.01); *H04W 72/06* (2013.01); *H04W 36/0055* (2013.01); *H04W 36/22* (2013.01); *H04W 72/048* (2013.01)

(58) Field of Classification Search
None
See application file for complete search history.

(56) References Cited

U.S. PATENT DOCUMENTS 7,349,371 B2 3/2008 Schein et al. .................. 370/329
7,957,351 B2 6/2011 Casaccia et al. .............. 370/334
(Continued)

FOREIGN PATENT DOCUMENTS

CN 1889751 A 1/2007
CN 101345988 A 1/2009
(Continued)

OTHER PUBLICATIONS

International Search Report and Written Opinion of International Search Authority for PCT/CN2009/071646 dated Aug 13, 2009 (9 pages).
(Continued)

*Primary Examiner* — Kerri Rose
(74) *Attorney, Agent, or Firm* — Imperium Patent Works; Zheng Jin

(57) ABSTRACT

A unified two-stage network entry procedure is provided for OFDM multi-carrier wireless communications systems. During a first stage, a mobile station performs a common network entry procedure using a primary radio frequency carrier and then exchanges multi-carrier capability information with a base station. In one embodiment, the base station transmits a network entry allowance indicator to assist the mobile station in selecting the primary carrier. The network entry allowance indicator comprises information of preference of one or more available carriers. During a second stage, the mobile station enables multi-carrier transmission over multiple frequency channels if both the mobile station and the base station support multi-carrier capability. Before enabling multi-carrier transmission, the mobile station may optionally perform additional ranging by transmitting a ranging request for a secondary carrier. In one embodiment, the base station replies with a ranging response in response to the ranging request through the primary carrier.

20 Claims, 10 Drawing Sheets

METHOD OF NETWORK ENTRY
PROCEDURE FOR MULTI-CARRIER BS/MS

(51) Int. Cl.
*H04W 72/06* (2009.01)
*H04W 36/00* (2009.01)
*H04W 36/22* (2009.01)

(56) References Cited

U.S. PATENT DOCUMENTS

| | | | |
|---|---|---|---|
| 2004/0029579 A1 | 2/2004 | Kashiwase | 455/424 |
| 2004/0228269 A1 | 11/2004 | Balakrishnan et al. | 370/208 |
| 2005/0078598 A1 | 4/2005 | Batra et al. | 370/206 |
| 2005/0195791 A1* | 9/2005 | Sung et al. | 370/342 |
| 2006/0084404 A1 | 4/2006 | Laroia et al. | 455/266 |
| 2006/0116123 A1 | 6/2006 | Purnadi et al. | 455/435.1 |
| 2006/0166672 A1 | 7/2006 | Lim et al. | 455/436 |
| 2006/0221894 A1 | 10/2006 | Casaccia et al. | 370/328 |
| 2007/0054862 A1 | 3/2007 | Masuda et al. | 514/13 |
| 2007/0097909 A1 | 5/2007 | Khandekar et al. | 370/329 |
| 2008/0316969 A1 | 12/2008 | Prakash et al. | 370/331 |
| 2009/0092194 A1 | 4/2009 | Wang et al. | 375/260 |
| 2009/0296665 A1 | 12/2009 | Provvedi et al. | 370/336 |
| 2010/0014467 A1 | 1/2010 | Wang et al. | 370/329 |
| 2010/0035625 A1 | 2/2010 | Damnjanovic et al. | 455/450 |
| 2010/0157923 A1 | 6/2010 | Jung et al. | 370/329 |
| 2010/0296473 A1 | 11/2010 | Kim et al. | 370/329 |
| 2011/0051711 A1 | 3/2011 | Kishiyama et al. | 370/350 |
| 2012/0027116 A1 | 2/2012 | Etemad | 375/267 |

FOREIGN PATENT DOCUMENTS

| | | |
|---|---|---|
| EP | 0760564 A2 | 8/1995 |
| EP | 1443758 A1 | 11/2001 |
| EP | 1655982 A2 | 5/2006 |
| EP | 1684538 A1 | 7/2006 |
| EP | 1906689 A1 | 2/2008 |
| EP | 2028868 A1 | 2/2009 |
| TW | 200612703 A | 4/2006 |
| TW | 200917691 A | 4/2009 |
| WO | WO2007023809 A1 | 3/2007 |
| WO | WO2007028252 | 3/2007 |
| WO | WO2007116224 A1 | 10/2007 |
| WO | WO2008095434 A1 | 8/2008 |
| WO | WO2009119834 | 10/2009 |

OTHER PUBLICATIONS

JP Office Action and Translation, for JP patent application 2011-507781, dated on Jul. 3, 2012 (6 pages).
Taiwan IPO, Examination Opinion of Taiwan patent application 098114809 dated Dec. 20, 2012 (10 pages).
JP Office Action of JP patent application 2012-506328, dated on Jan. 22, 2013 (6 pages).
R1-091487, 3GPP TSG RAN WG1 Meeting #56bis, NTT DOCOMO, "Initial Access Procedure for Asymmetric Wider Bandwidth in LTE-Advanced", Seoul, Korea, Mar. 2009.
R1-091209, 3GPP TSG RAN WG1 Meeting #56bis, LG Electronics, "Initial Access Procedure in LTE-Advanced", Seoul, Korea, Mar. 23-27, 2009 (4 pages).
Taiwan IPO, the Examination Opinion of the Taiwan patent application 099112818 dated Apr. 17, 2013 (4 pages).
EPO Search Report for the EP patent application 09741711.7 dated Sep. 11, 2015 (7 pages).

* cited by examiner

METHOD OF NETWORK ENTRY
PROCEDURE FOR MULTI-CARRIER BS/MS

WITHOUT NETWORK ENTRY
ALLOWANCE INDICATION

72
NETWORK ENTRY
ALLOWANCE INDICATOR

MULTI-CARRIER MS ONLY PERFORM NETWORK ENTRY
WITH MULTI-CARRIER BS THROUGH CARRIER #1

COMMUNICATION BETWEEN MULTI-CARRIER BS AND MS
WILL NOT BE DISTURBED BY THE SHIFTED CENTER
FREQUENCY IN FREQUENCY CHANNEL #2

METHOD OF NETWORK ENTRY IN OFDM MULTI-CARRIER WIRELESS COMMUNICATIONS SYSTEMS

CROSS REFERENCE TO RELATED APPLICATIONS

This application is a continuation, and claims priority under 35 U.S.C. §120 from nonprovisional U.S. patent application Ser. No. 12/387,633, entitled "Method of Network Entry in OFDM Multi-Carrier Wireless Communications Systems," filed on May 4, 2009, the subject matter of which is incorporated herein by reference. Application Ser. No. 12/387,633, in turn, claims priority under 35 U.S.C. §119 from U.S. Provisional Application No. 61/050,277, entitled "Control Structure, Ranging and Initialization Procedure for Multi-band OFDMA Systems," filed on May 5, 2008; U.S. Provisional Application No. 61/156,574, entitled "Methods for Configuring Multi-Carrier Transmission in OFDM Multi-Carrier Systems," filed on Mar. 2, 2009; U.S. Provisional Application No. 61/154,022, entitled "Method of Network Entry in OFDMA Multi-Carrier Systems," filed on Feb. 20, 2009, the subject matter of which is incorporated herein by reference.

TECHNICAL FIELD

The disclosed embodiments relate generally to wireless network communications, and, more particularly, to network entry in OFDM multi-carrier systems.

BACKGROUND

In current wireless communications systems, 5 MHz~10 MHz radio bandwidths are typically used for up to 100 Mbps peak transmission rate. Much higher peak transmission rate is required for next generation wireless systems. For example, 1 Gbps peak transmission rate is required by ITU-R for IMT-Advanced systems such as the $4^{th}$ generation ("4G") mobile communications systems. The current transmission technologies, however, are very difficult to perform 100 bps/Hz transmission spectrum efficiency. In the foreseeable next few years, only up to 15 bps/Hz transmission spectrum efficiency can be anticipated. Therefore, much wider radio bandwidths (i.e., at least 40 MHz) will be necessary for next generation wireless communications systems to achieve 1 Gbps peak transmission rate.

Orthogonal Frequency Division Multiplexing (OFDM) is an efficient multiplexing protocol to perform high transmission rate over frequency selective channel without the disturbance from inter-carrier interference. OFDM has been adopted by both IEEE 802.16m and LTE draft standards and is anticipated to be a foundation of next generation wireless communications systems. Based on OFDM, various multiple access schemes such as OFDMA, OFDM/CDMA, and OFDM/TDMA have been developed and utilized in multi-user wireless systems.

FIG. 1 (Prior Art) illustrates two typical architectures to utilize much wider radio bandwidth for OFDM systems. In a traditional OFDM system, a single radio frequency (RF) carrier is used to carry one wideband radio signal, and in an OFDM multi-carrier system, multiple RF carriers are used to carry multiple narrower band radio signals. In the example of FIG. 1, a traditional OFDM system 1 uses a single RF carrier #1 to carry a wideband radio signal #1, transmitted through one frequency channel #1 (i.e., 40 MHz Bandwidth, 4096 FFT). On the other hand, an OFDM multi-carrier system 11 uses four RF carriers #1-#4 to carry four narrower band radio signals #1-#4, each transmitted through a corresponding 10 MHz frequency channel #1-#4 (i.e., 10 MHz Bandwidth, 1024 FFT).

An OFDM multi-carrier system has various advantages as compared to a traditional OFDM system. First, an OFDM multi-carrier system has lower Peak to Average Power Ratio (PAPR) for uplink transmission because of smaller FFT size for each carrier. Second, it is easier to support backward compatibility with legacy OFDM systems. For example, the frequency channels in an OFDM multi-carrier system are partitioned into 10 MHz bandwidth to fit legacy WiMAX systems. Third, current hardware design such as legacy PHY layer design can be better reused by the same frequency channel bandwidths and parameters. Finally, in an OFDM multi-carrier system, it is possible to have more flexibility in Mobile Stations (MSs) that support different number of carriers and perform different level of service capabilities. Because of such advantages, OFDM multi-carrier systems have become the baseline system architecture in IEEE 802.16m and LTE-Advanced draft standards to fulfill IMT-Advanced system requirements. It is thus desirable to provide a unified network entry procedure to enable the operation of OFDM multi-carrier systems.

SUMMARY

A unified two-stage network entry procedure is provided for a mobile station and a base station in an OFDM multi-carrier wireless communications system. During a first stage of common network entry procedure, the mobile station selects one of the available radio frequency carriers as the primary carrier to perform network entry and ranging. The mobile station also exchanges multi-carrier capability information with the base station. During a second stage of additional network entry procedure, the mobile station enables multi-carrier transmission over multiple frequency channels if both the mobile station and the base station support multi-carrier capability. Before enabling multi-carrier transmission, the mobile station may optionally perform additional ranging by transmitting a ranging request for a secondary carrier. In response to the ranging request, the base station may reply with a ranging response through the primary carrier.

In one novel aspect, the base station transmits a network entry allowance indicator to assist the mobile station in selecting the primary carrier. The network entry allowance indicator comprises information of preference of one or more available carriers. In one embodiment, such preference may be based on load balancing condition. By receiving such information from the base station, the mobile station is able to select a carrier as its primary carrier and achieve load balance during the initial stage of network entry procedure. In another embodiment, such preference may be based on other network parameters to serve other purposes such as avoiding sub-carrier misalignment operation.

In another novel aspect, the unified two-stage network entry procedure is compatible between both multi-carrier and single-carrier base stations and mobile stations in an OFDM wireless system. Based on the multi-carrier capability information exchanged during the common network entry procedure, the mobile station can determine whether to proceed to the second stage of additional network entry procedure. If either the mobile station or the base station supports single-carrier capability, then network entry is performed only for the primary carrier and no additional network entry is necessary. On the other hand, if both the mobile station and the base station support multi-carrier capability, then the mobile station may enable multi-carrier transmission after reconfiguring its hardware and performing additional ranging for the secondary carrier.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
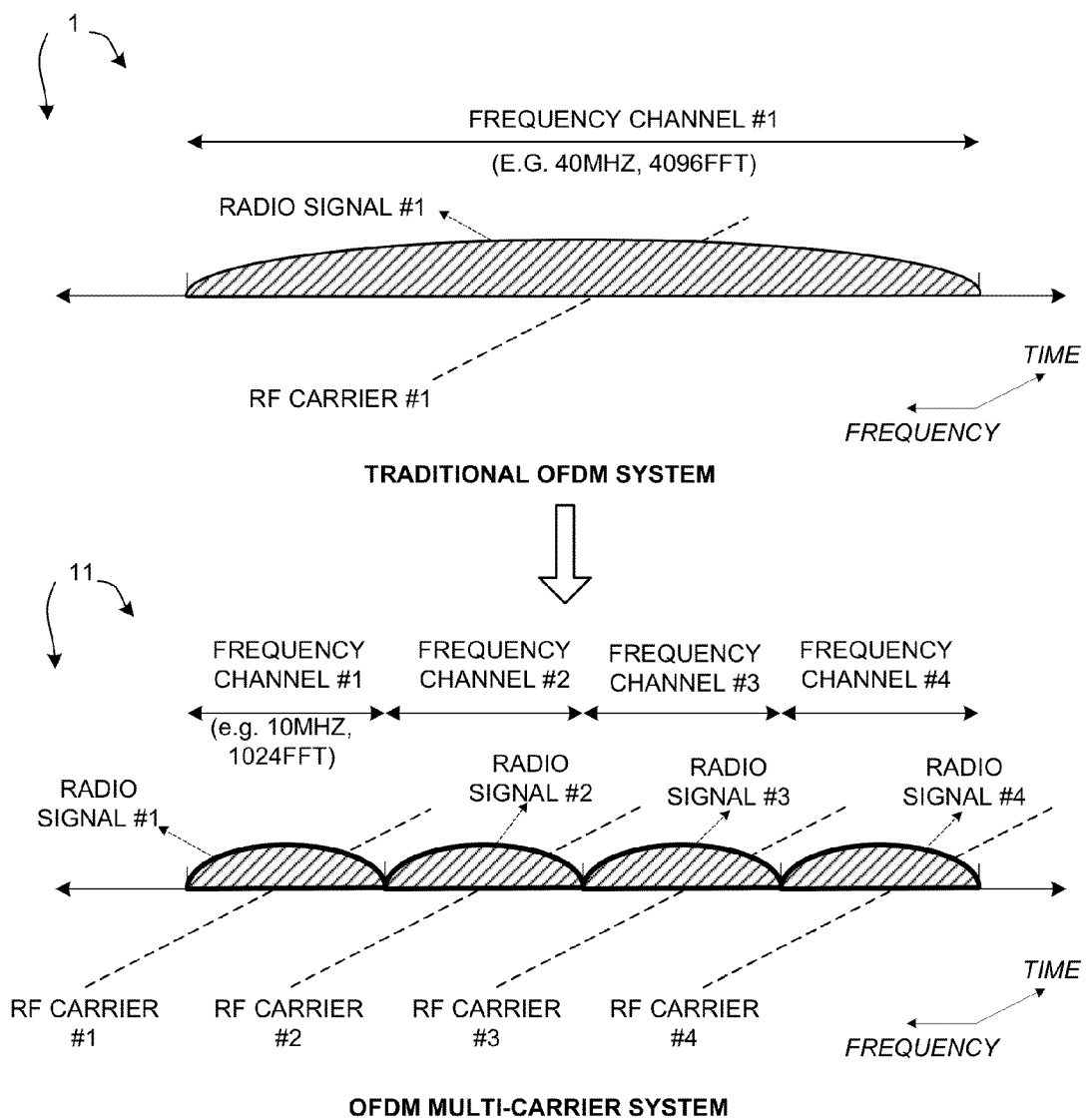
FIG. 1 (Prior Art) illustrates two typical architectures to utilize much wider radio bandwidth for OFDM systems.
Figure 2:
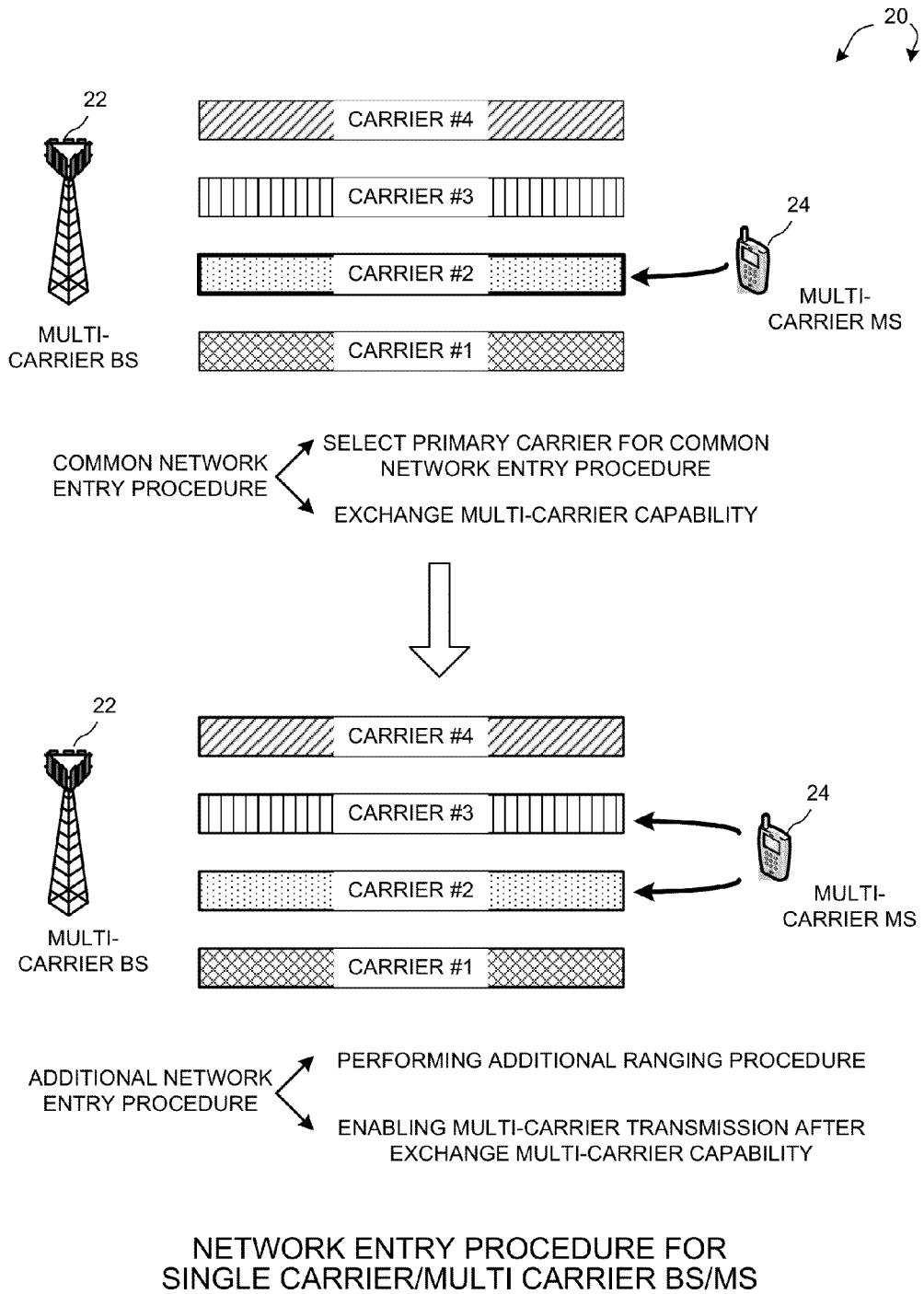
FIG. 2 illustrates a network entry procedure of an OFDM wireless network in accordance with one novel aspect.

FIG. 2 illustrates a network entry procedure of an OFDM wireless network 20 in accordance with one novel aspect. OFDM wireless network 20 is a multi-carrier communications system that comprises a multi-carrier base station BS22 and a multi-carrier mobile station MS24. Both BS22 and MS24 support four radio frequency (RF) carriers #1-#4. In order to access the wireless network, MS24 needs to perform network entry procedure with BS22 to synchronize the time and frequency with BS22 and to negotiate other network capabilities and parameters. As illustrated in FIG. 2, the network entry procedure is divided into two stages: a first stage of common network entry procedure and a second stage of additional network entry procedure. During the common network entry procedure, MS24 first select one of the RF carriers (for example, RF carrier #2, as illustrated in FIG. 2) as the primary RF carrier to perform network entry. MS24 also exchanges its multi-carrier capability with BS 22 during the common network entry procedure. During the additional network entry procedure, MS24 may optionally perform additional ranging procedure over a secondary RF carrier (for example, RF carrier #3, as illustrated in FIG. 2). After the ranging procedure is successfully completed, MS24 then enables multi-carrier transmission such that data transmission is supported over both RF carrier #2 and RF carrier #3 simultaneously.

Figure 3:
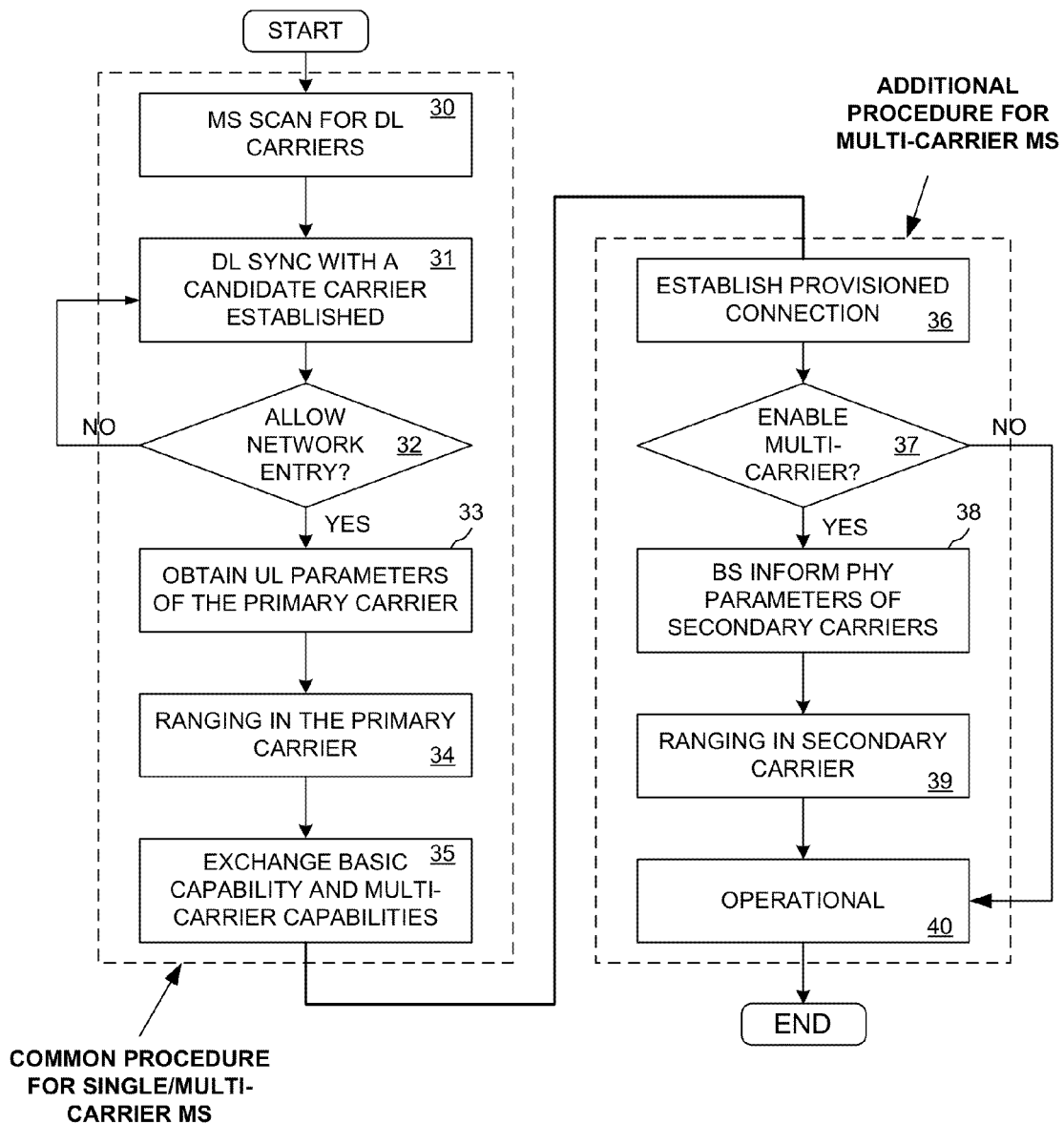
FIG. 3 is a flow chart of a method of network entry procedure for OFDM multi-carrier systems in accordance with one novel aspect.

FIG. 3 is a flow chart illustrating a method of network entry procedure in OFDM multi-carrier wireless network 20 in more detail. MS24 starts with the first stage of a common network entry procedure that can be used for either a single-carrier or a multi-carrier mobile station. In step 30, MS24 scans all downlink carriers that might be available to perform network entry. MS24 then establishes synchronization with a downlink carrier in step 31. In step 32, MS24 receives information from BS22 about whether the synchronized downlink carrier is allowed to perform network entry. If the answer is no, then MS24 goes back to step 31 and continues with the next available carrier. If the answer is yes, then MS24 selects that carrier as its primary carrier and proceeds to step 33 to obtain uplink parameters of the primary carrier. In step 34, MS24 performs ranging for the primary carrier. During the common network entry procedure, MS24 also exchanges basic capabilities and multi-carrier capabilities with BS22 in step 35. The information exchanged in step 35 comprises information such as whether BS22 and MS24 support single-carrier and/or multi-carrier capability, the number of antennas, and/or the number of RF carriers supported by BS22 and MS24.

After ranging is successfully completed in the common network entry procedure, MS24 then establishes provisioned connection with BS22 over the primary carrier in step 36. Next, MS24 enters the second stage of additional network entry procedure. MS24 first decides whether to enable multi-carrier transmission in step 37 after multi-carrier capabilities have been exchanged with BS22. If the answer is no (for example, BS22 does not support multi-carrier capability), then MS24 proceeds to step 40 and starts with operation and data transmission over the primary carrier. If the answer is yes, then MS24 receives parameters of a secondary carrier from BS22 in step 38. In step 39, MS24 performs ranging for the secondary carrier. After ranging is successfully completed in the secondary carrier, MS24 then enables multi-carrier transmission in step 40 and is able to transmit data over both the primary carrier and the secondary carrier simultaneously.

Figure 4:
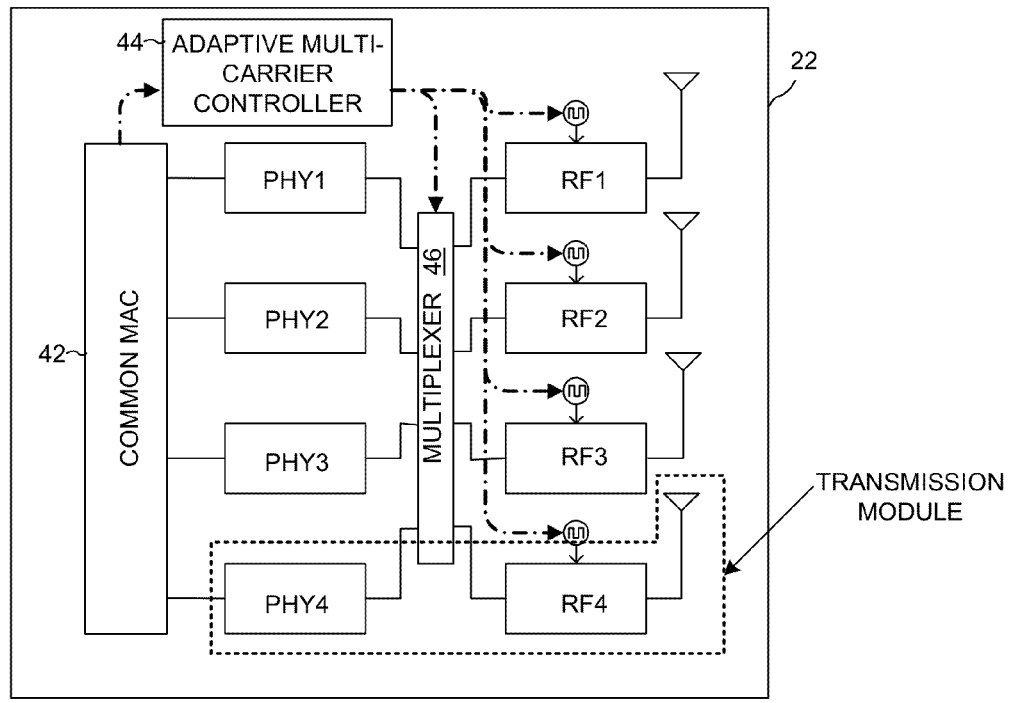
FIG. 4 is a simplified block diagram of a multi-carrier base station.

FIG. 4 is a simplified block diagram of a multi-carrier base station BS22. BS22 comprises a common media access control (MAC) module 42, an adaptive multi-carrier controller 44, a plurality of physical layer modules (PHY1-PHY4 as depicted), a plurality of RF transceivers (RF1-RF4 as depicted), a plurality of antennas, and a multiplexer 46 that interconnects the PHY modules and the RF transceivers. Each PHY module, RF transceiver and antenna forms a transmission module as depicted in FIG. 4. Each transmission module corresponds to the operation of one RF carrier. Common MAC module 42 is coupled to both adaptive multi-carrier controller 44 and the transmission modules. By using a common MAC module, the MAC layer design remains transparent to the underlying RF carriers and antennas. This unified transceiver architecture for a multi-carrier base station is particularly suitable for the unified network entry procedure illustrated above with respect to FIG. 2 and FIG. 3.

Figure 5:
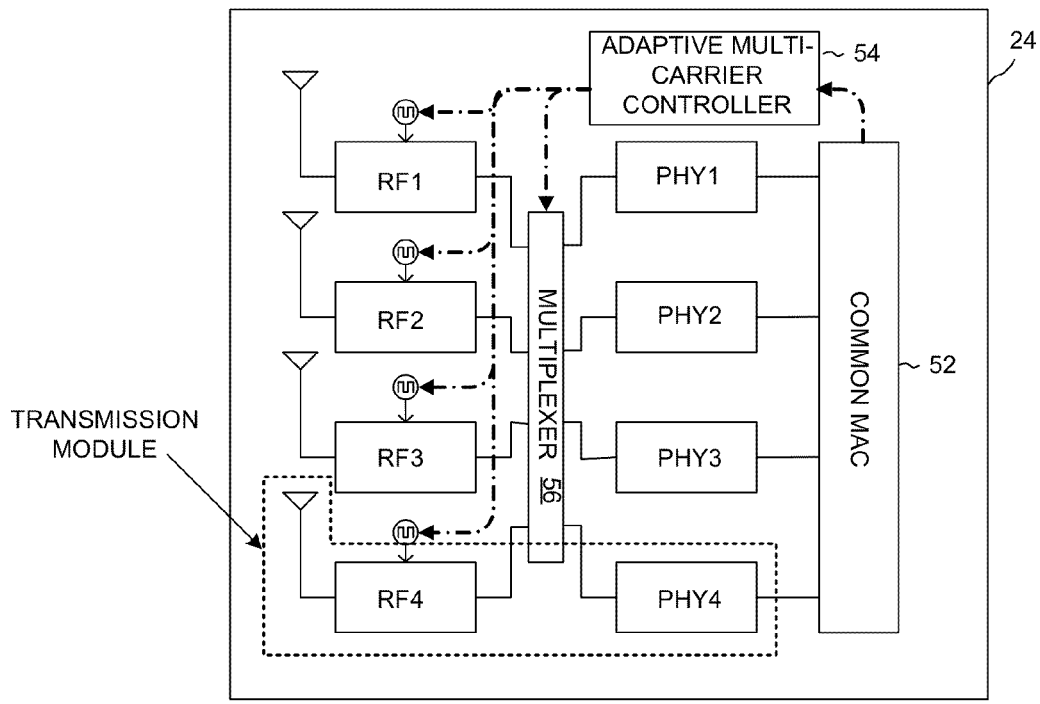
FIG. 5 is a simplified block diagram of a multi-carrier mobile station.

FIG. 5 is a simplified block diagram of a multi-carrier mobile station MS24. Similar to BS22 in FIG. 4, MS24 comprises a common MAC module 52, an adaptive multi-carrier controller 54, a plurality of physical layer modules (PHY1-PHY4 as depicted), a plurality of RF transceivers (RF1-RF4 as depicted), a plurality of antennas, and a multiplexer 56 that interconnects the PHY modules and the RF transceivers.

Again, by using a common MAC module, the MAC layer design of MS24 remains transparent to the underlying RF carriers and antennas. This unified transceiver architecture for a multi-carrier mobile station is particularly suitable for the unified network entry procedure in accordance with the present invention.

Figure 6:
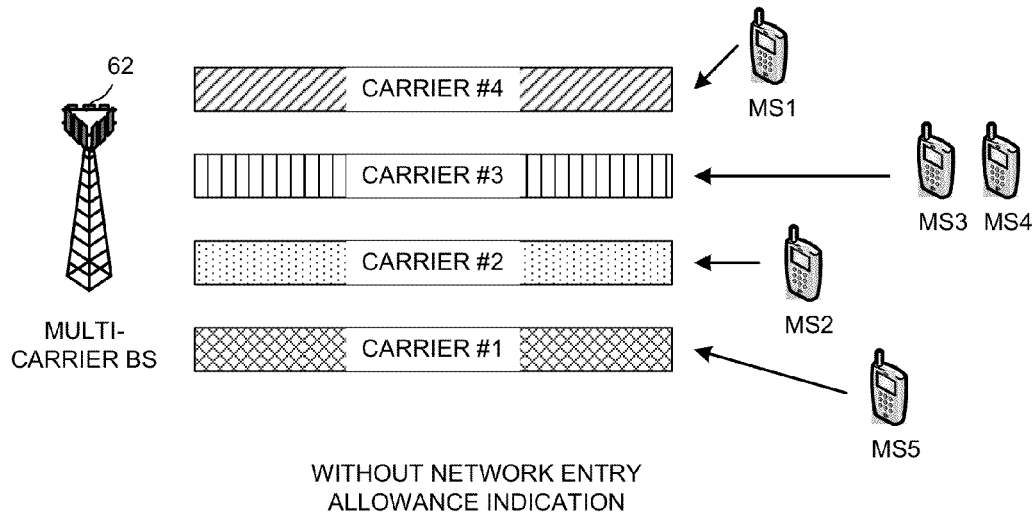
FIG. 6 illustrates an example of common network entry procedure without network entry allowance indicator.

In one novel aspect, during the common network entry procedure, a base station may transmit a network entry allowance indicator to a mobile station in assisting the mobile station to make preferred primary carrier selection. FIG. 6 illustrates one embodiment for primary RF carrier selection during the common network entry procedure. As illustrated in FIG. 6, five mobile stations MS1-MS5 are in the process of scanning available RF carriers and then selecting one of the RF carriers as its primary RF carrier to perform network entry with BS62. BS62 provides four carriers #1-#4 available for the mobile stations to perform network entry, but BS62 does not provide additional information on which of the carriers is either a preferred or a non-preferred carrier. As a result, each mobile station randomly selects one of the carriers as its primary carrier. In the example of FIG. 6, MS1 selects carrier #4, MS2 selects carrier #2, MS3 and MS4 each selects carrier #3, and MS5 selects carrier #1 as the primary carrier, respectively. If such random selection of primary carrier results in load unbalance, then BS62 has to use intra-cell handover procedure to switch the primary carriers of the mobile stations.

Figure 7:
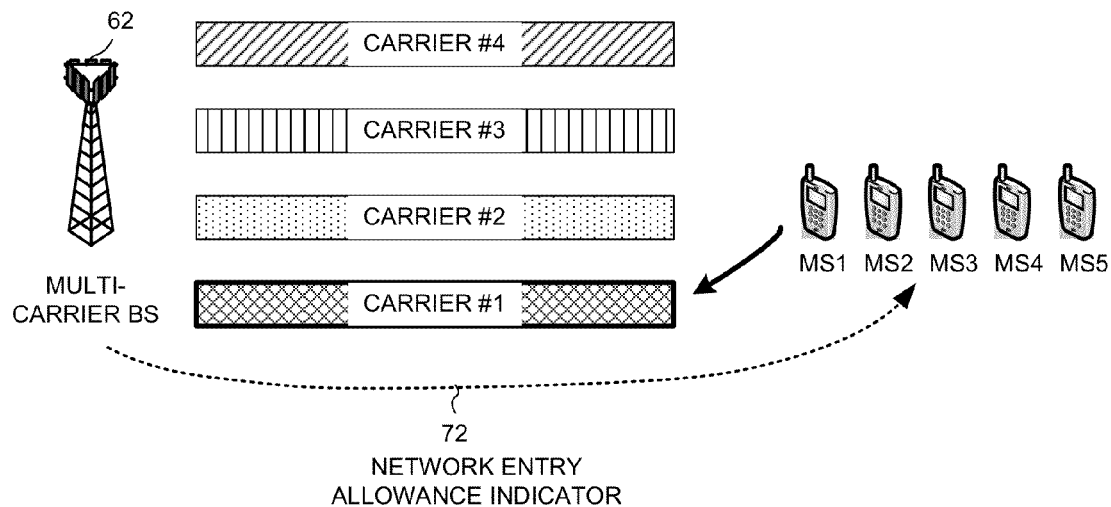
FIG. 7 illustrates an example of common network entry procedure with network entry allowance indicator.

FIG. 7 illustrates another embodiment for primary RF carrier selection during the common network entry procedure. In the example of FIG. 7, base station BS62 transmits a network entry allowance indicator 72 to the mobile stations MS1-MS5. Network entry allowance indicator 72 comprises information such as whether a particular carrier is preferred to be used as the primary carrier. Such preference may be based on load balancing and other network parameters. In the example of FIG. 7, carrier #1 has the lightest load and is preferred to be used as the primary carrier. By receiving such information from BS62 via network entry allowance indicator 72, mobile stations MS1-MS5 are able to select RF carrier #1 as its primary carrier and achieve load balance during the initial stage of network entry procedure. In addition to the initial network entry, the proposed allowance indicator can also be used in handover reentry procedures.

Figure 8:
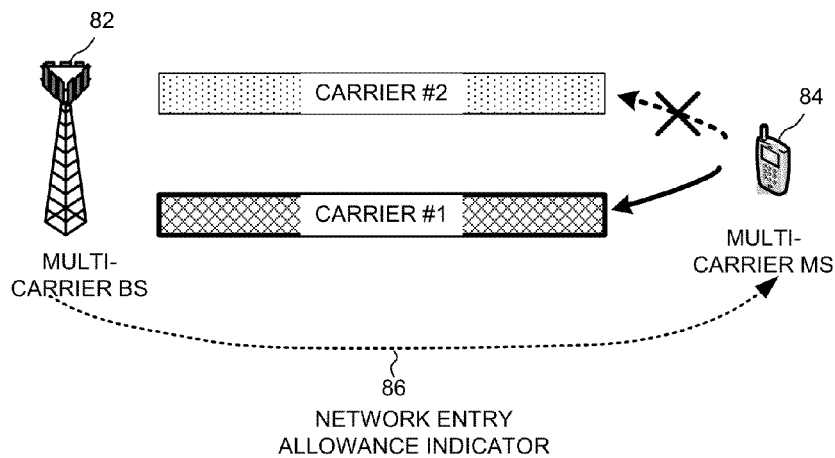
FIG. 8 illustrates an example of selecting a primary RF carrier for common network entry procedure to avoid sub-carrier misalignment operation.
Figure 8:
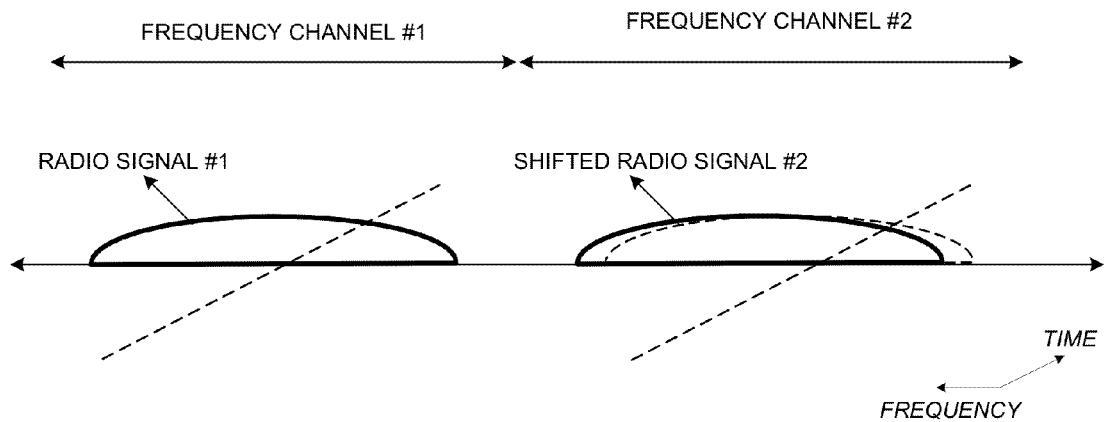

FIG. 8 illustrates an example of selecting a primary RF carrier during common network entry procedure to avoid sub-carrier misalignment operation. In addition to achieving load balance, a network entry allowance indicator may serve other purposes in assisting the selection for primary carrier. In an OFDM system, sometimes the center frequency of a radio signal transmitted over each frequency channel is not the same as the ones defined in the OFDM system. As illustrated in FIG. 8, multi-carrier base station BS82 supports two RF carriers: carrier #1 and carrier #1. Carrier #1 carries radio signal #1 and is transmitted by frequency channel #1. Carrier #2 carries radio signal #2 and is transmitted by frequency channel #2. The center frequency of radio signal #1 aligns with the predefine center frequency of frequency channel #1, while the center frequency of radio signal #2 is shifted from the center frequency of frequency channel #2. As a result, multi-carrier mobile station MS84 may not be able to connect with BS82 through frequency channel #2 due to unknown center frequency at initial stage. In the example of FIG. 8, BS82 transmits a network entry allowance indicator 86 to MS84, guiding MS84 to select carrier #1 as the primary carrier. Thus, MS84 will not waste additional time to scan the rest carriers with which it would have difficulty to establish connection.

Figure 9:
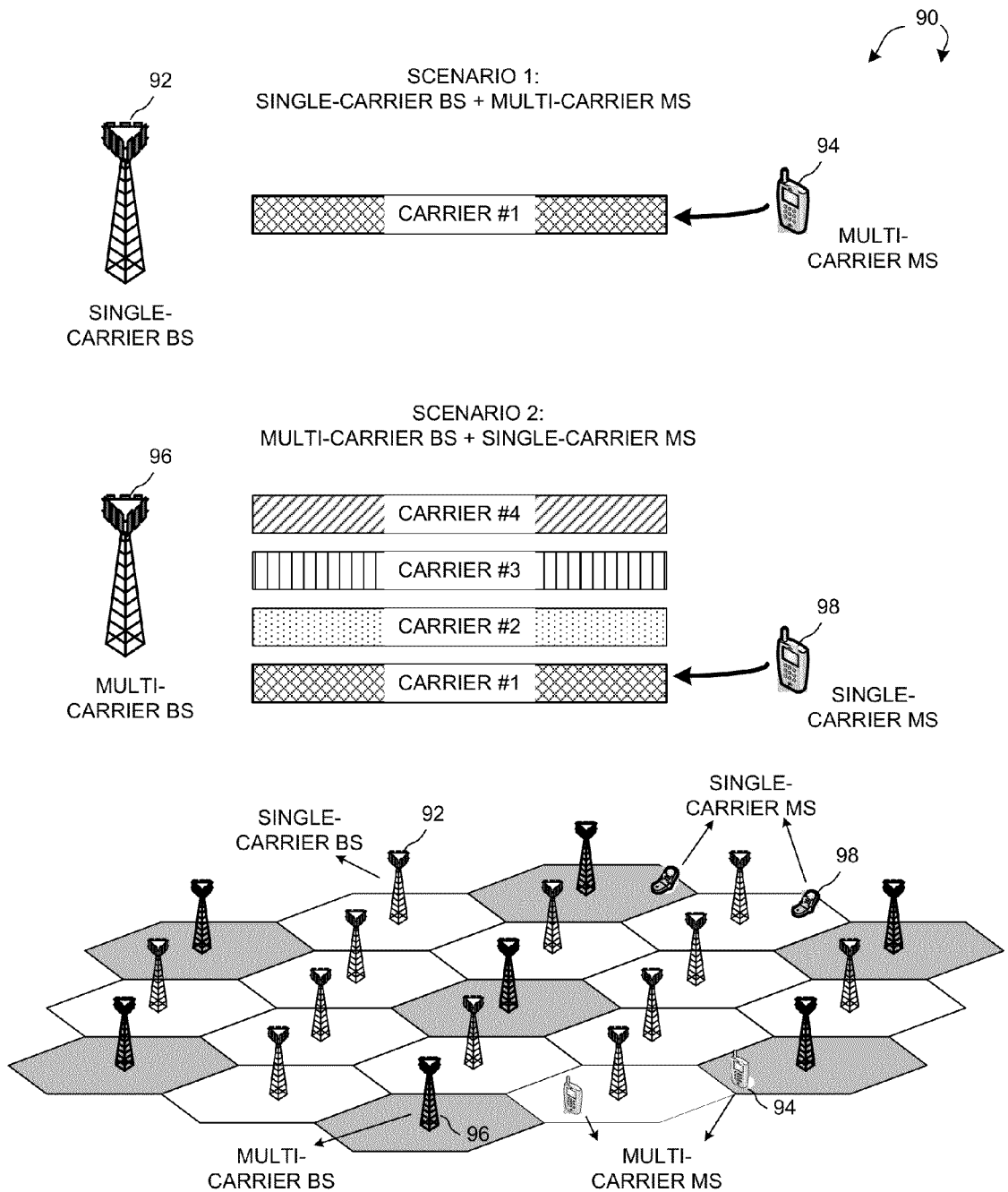
FIG. 9 illustrates network entry compatibility among single-carrier and/or multi-carrier base stations and mobile stations.

In another novel aspect, during the common network entry procedure, mobile stations and base stations also exchange multi-carrier capabilities such that the unified two-stage network entry procedure is compatible with both single-carrier and multi-carrier base stations and mobile stations. FIG. 9 illustrates network entry compatibility among single-carrier and multi-carrier base stations and mobile stations in an OFDM wireless system 90. OFDM wireless system 90 comprises a mixed of single-carrier and multi-carrier base stations and mobile stations, for example, a single-carrier base station BS92, a multi-carrier base station BS96, a single-carrier mobile station MS94, and a multi-carrier mobile station MS98. In a first scenario, multi-carrier MS94 performs network entry with single-carrier BS92, which only supports RF carrier #1. Under the novel two-stage network entry procedure, MS94 first selects carrier #1 as the primary carrier and performs ranging during the first stage of common network entry. Because BS92 does not support multi-carrier capability, the second stage of additional network entry is no longer needed. In a second scenario, single-carrier MS98 performs network entry with multi-carrier BS96. MS98 only supports RF carrier #1 while BS96 supports four RF carriers #1-#4. Under the novel two-stage network entry procedure, MS98 selects carrier #1 as the primary carrier and performs ranging during the first stage of common network entry. Because MS98 does not support multi-carrier capability, the second-stage of additional network entry is no longer needed. Thus, the unified two-stage network entry procedure is compatible for both multi-carrier and single-carrier base stations and mobile stations in OFDM wireless system 90.

Figure 10:
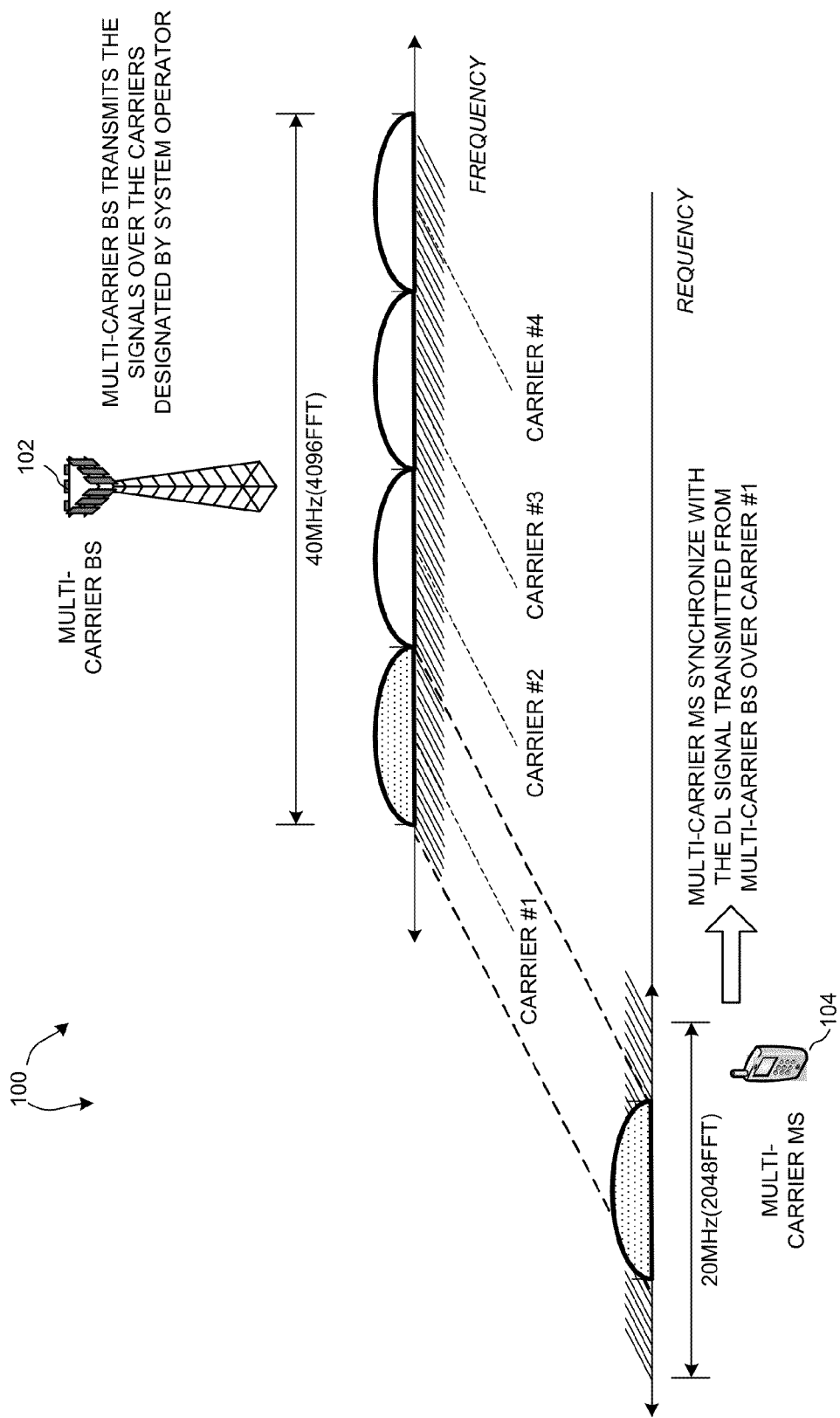
FIG. 10 illustrates an example of performing additional network entry and enabling multi-carrier transmission in an OFDM wireless system.
Figure 11:
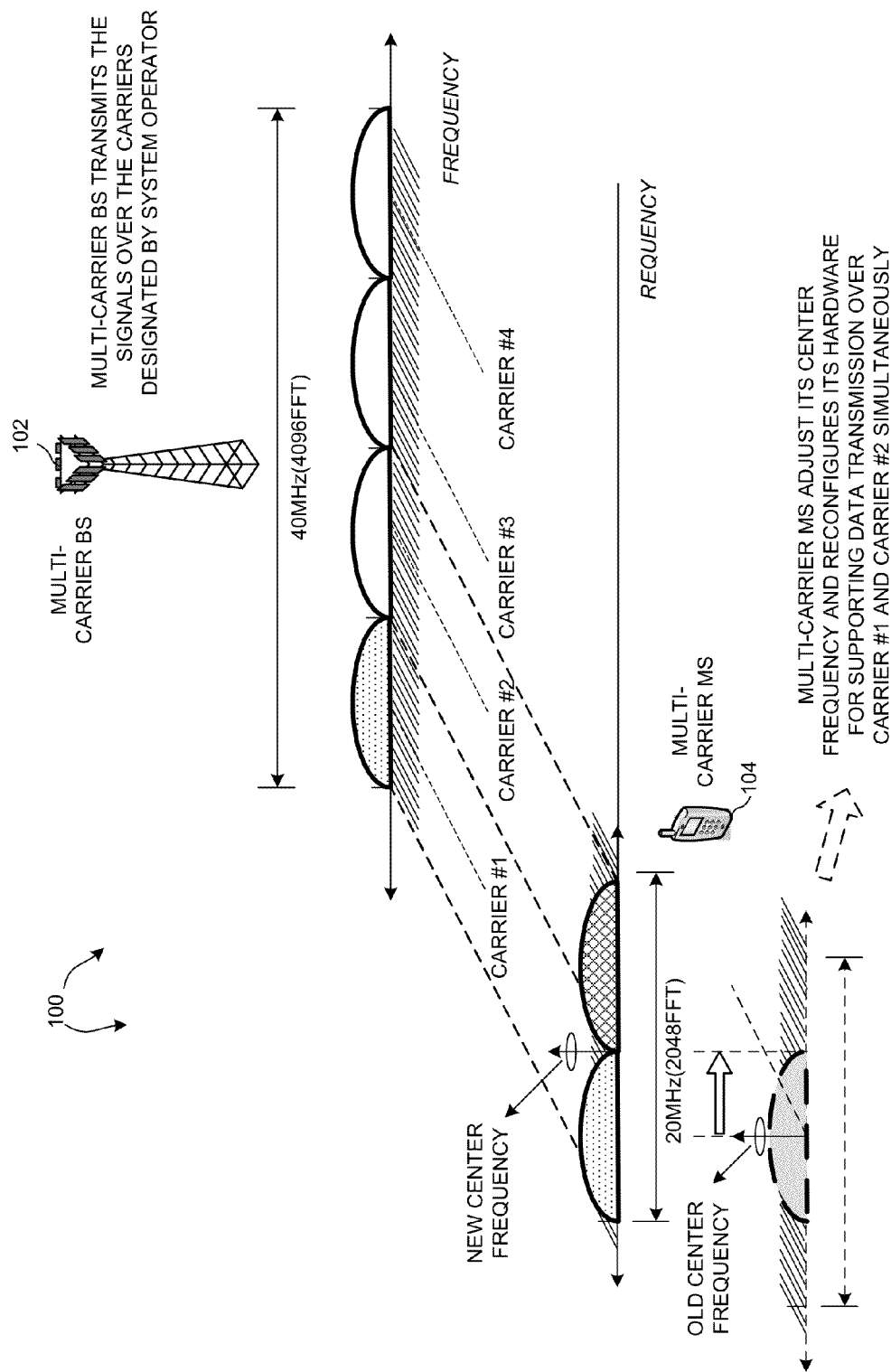
FIG. 11 illustrates the activation of a secondary carrier to support data transmission over multiple carriers simultaneously in an OFDM wireless system.

If both base stations and mobile stations support multi-carrier capabilities, then the second stage of additional network entry procedure can be performed after the selection of primary carrier and the exchange of multi-carrier capabilities. FIG. 10 and FIG. 11 illustrate an example of performing additional network entry and enabling multi-carrier transmission in an OFDM wireless system 100. OFDM wireless system 100 comprises a multi-carrier base station BS102 and a multi-carrier mobile station MS104. BS102 supports transmitting radio signals over four 10 MHz carriers #1-#4 designated by system operator, and MS104 supports transmission over 2×10 MHz carriers utilizing 2048 FFT. As illustrated in FIG. 10, MS104 selects carrier #1 as the primary carrier and turns on the center 1024 FFT to support 10 MHz carrier #1 for initial network entry. MS104 only transmits 10 MHz waveform radio signal by nulling the FFT out of the center 1024 points. MS104 controls its frequency synthesizer for adjusting the center frequency for scanning the downlink signals transmitted from BS102. As a result, the center frequency of MS104 is the same as carrier #1.

FIG. 11 illustrates the activation of a secondary carrier to support data transmission over multiple carriers simultaneously in OFDM wireless system 100. In the example of FIG. 11, MS104 activates carrier #2 as its secondary carrier for multi-carrier transmission. When activating the secondary carrier, MS104 has to shift its center frequency location to ensure its 2048 FFT can cover the bandwidth of both carrier #1 and carrier #2. Thus, MS104 will need some time to reconfigure its RF frequency synthesizer and baseband hardware. In addition, MS104 will need to enable the software control entity for processing the signaling over the secondary carrier. As a result, it is desirable to reserve a short time period for MS104 to reconfigure and then perform ranging before enabling multi-carrier transmission.

Figure 12:
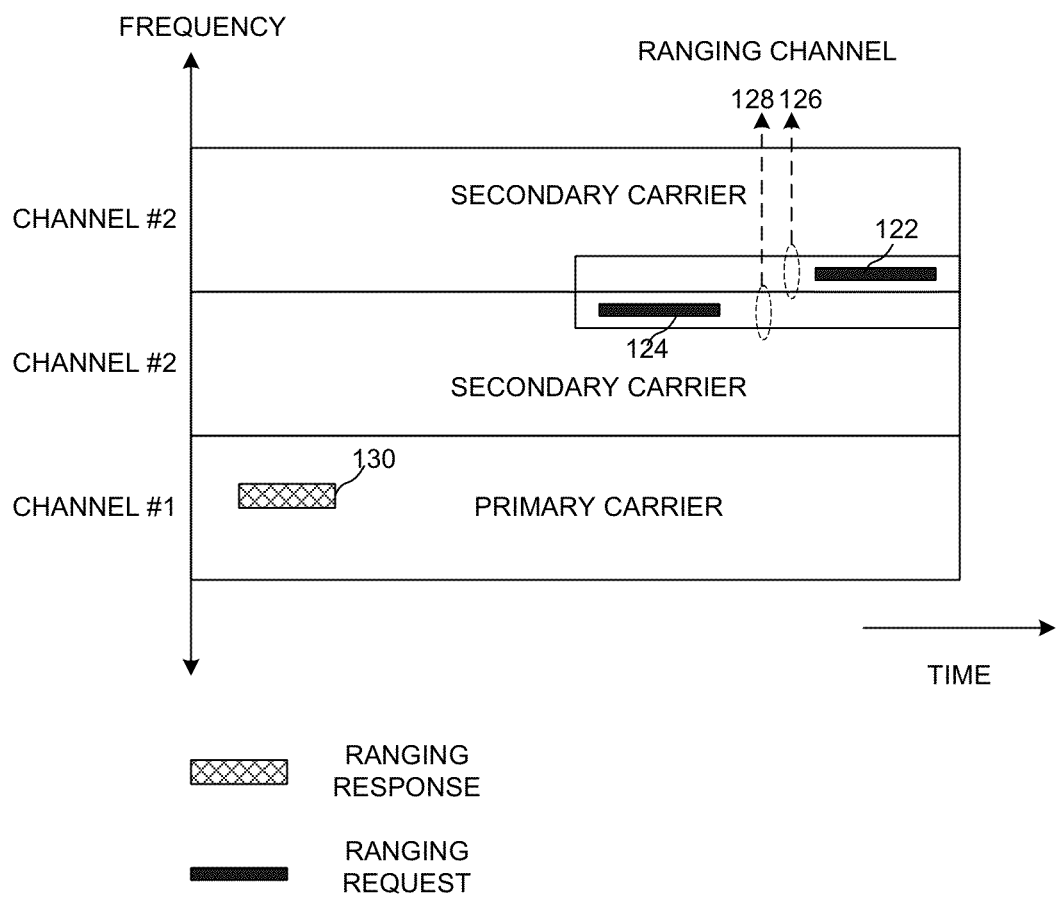
FIG. 12 is a diagram of additional network entry with ranging procedure before activating a secondary RF carrier for data transmission in an OFDM wireless system.

FIG. 12 is a diagram of additional network entry with ranging procedure before activating a secondary RF carrier for data transmission in an OFDM wireless system. In the example of FIG. 12, a primary carrier is used to carry radio signals through frequency channel #1, and a secondary carrier is used to carry radio signals through frequency channel #2. After the primary carrier has been selected for initial ranging and connected for data transmission, the mobile station performs additional ranging procedure for the secondary carrier. The mobile station transmits ranging requests 122 and 124 using ranging channel 126 and 128, respectively. Typically, the base station may reply a ranging response through the secondary carrier. As illustrated in FIG. 12, however, the base station may reply ranging response 130 through the existing connection in the primary carrier. Therefore, communication through the primary carrier will not be disrupted when the mobile station performs ranging through the secondary carrier.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) performing a common network entry procedure using a primary radio frequency (RF) carrier by a mobile station in an OFDM wireless network, wherein the mobile station obtains uplink parameters of the primary carrier and performs ranging for the primary carrier;
   (b) exchanging multi-carrier capability information with a base station, wherein the multi-carrier capability information comprises information on number of carriers that can be simultaneously supported by the mobile station and the base station; and
   (c) enabling multi-carrier transmission over multiple frequency channels if both the mobile station and the base station support multi-carrier capability.

2. The method of claim 1, further comprising:
   (d) obtaining the primary RF carrier to perform the common network entry procedure based on a network entry allowance indicator received from the base station.

3. The method of claim 2, wherein the obtaining in (d) involves scanning a plurality of carriers and selecting one of the carriers as the primary RF carrier to perform the common network entry procedure based on the network entry allowance indicator.

4. The method of claim 3, wherein the network entry allowance indicator comprises information of preference of one or more available carriers.

5. The method of claim 3, wherein the network entry allowance indicator comprises information of loading of one or more available carriers.

6. The method of claim 1, wherein the common network entry procedure comprises operations to support either an initial network entry or a handover network reentry.

7. The method of claim 1, further comprising:
   (d) performing ranging using a secondary carrier before enabling multi-carrier transmission; and
   (e) receiving a ranging response for the secondary carrier.

8. The method of claim 7, wherein the secondary carrier is the carrier that the mobile station did not perform network entry operation with the base station.

9. The method of claim 7, wherein a ranging response for the secondary carrier is replied through the primary carrier.

10. The method of claim 1, wherein a secondary carrier is enabled for multi-carrier transmission, and wherein the enabling in (c) involves shifting center frequency and reconfiguring hardware of the mobile station.

11. A wireless device, comprising:
    a first transmission module that is operable in a first radio frequency (RF) carrier by a first frequency channel;
    a second transmission module that is operable in a second RF carrier by a second frequency channel; and
    an adaptive multi-carrier controller that selects the first RF carrier to perform a common network entry procedure with a base station in an OFDM wireless network, wherein the wireless device exchanges multi-carrier capability with the base station and thereafter enables the second RF carrier for data transmission over the second frequency channel if the base station supports multi-carrier capability, and wherein the multi-carrier capability comprises information on number of carriers that can be simultaneously supported by the wireless device and the base station.

12. The wireless device of claim 11, wherein the adaptive multi-carrier controller selects the first carrier based on a network entry allowance indicator provided by the base station.

13. The wireless device of claim 11, wherein the wireless device performs a second ranging for the secondary carrier before enabling the second carrier for data transmission.

14. The wireless device of claim 13, wherein the wireless device receives a ranging response for the secondary carrier through the first frequency channel.

15. The wireless device of claim 11, wherein the secondary carrier is adjacent to the first carrier, and wherein a center frequency for data transmission is shifted before enabling the second carrier.

16. The wireless device of claim 11, further comprising:
    a common MAC layer that is coupled to both the first and the second transmission modules, wherein the common MAC layer is also coupled to the adaptive multi-carrier controller.

17. A method, comprising:
    (a) receiving a network entry request by a base station for a primary radio frequency (RF) carrier from a mobile station in an OFDM wireless network;
    (b) exchanging multi-carrier capability information with the mobile station, wherein the multi-carrier capability information comprises information on number of carriers can be simultaneously supported by the mobile station and the base station; and
    (c) receiving data signals over multiple frequency channels if both the mobile station and the base station support multi-carrier capability.

18. The method of claim 17, further comprising:
    (d) providing a network entry allowance indicator to the mobile station, wherein the network entry allowance indicator comprises information of preference of one or more radio frequency carriers.

19. The method of claim 17, further comprising:
    (d) receiving a second network entry request for a secondary carrier before receiving data signals over the second carrier; and
    (e) transmitting a ranging response for the secondary carrier.

20. The method of claim 19, wherein a ranging response for the secondary carrier is replied through the primary carrier.

* * * * *